United States Patent [19]
Mueller et al.

[11] Patent Number: 5,465,412
[45] Date of Patent: Nov. 7, 1995

[54] APPARATUS AND METHOD FOR DETERMINING A POINT IN TIME FOR DETECTING A SAMPLED SIGNAL IN A RECEIVER

[75] Inventors: Bruce D. Mueller, Palatine; Kevin L. Baum, Hoffman Estates, both of Ill.

[73] Assignee: Motorola, Schaumburg, Ill.

[21] Appl. No.: 64,182

[22] Filed: May 19, 1993

[51] Int. Cl.⁶ .................................... H04B 1/10
[52] U.S. Cl. ............ 455/296; 455/226.3; 375/346; 375/348
[58] Field of Search .................. 455/296, 295, 455/303, 226.3; 375/101, 99, 94, 100, 95, 10

[56] References Cited

U.S. PATENT DOCUMENTS

| | | | |
|---|---|---|---|
| 4,768,208 | 8/1988 | Cornett | 375/95 |
| 5,091,918 | 2/1992 | Wales | 375/99 |
| 5,164,964 | 11/1992 | Kubo | 375/100 |
| 5,191,598 | 3/1993 | Backstrom et al. | 375/101 |
| 5,263,026 | 11/1993 | Parr et al. | 375/100 |

FOREIGN PATENT DOCUMENTS

91/07831  5/1991  WIPO.

Primary Examiner—Reinhard J. Eisenzopf
Assistant Examiner—Doris To
Attorney, Agent, or Firm—Kevin D. Kaschke

[57] ABSTRACT

In a receiver (101) that receives a signal (103) subsequent to transmission thereof by a transmitter on a communication channel, an apparatus and method for determining a point in time for detecting the signal, sampled at multiple points in time, to produce a detected signal (112). The communication channel is modeled, at the multiple points in time, responsive to the sampled signal (110) to produce signal and noise channel models (209) and (204), respectively. Signal and noise values (210) and (205) indicative of the quantity of signal and noise in the signal and noise channel models, respectively, are generated. A sampling point selector (203) selects, from among the multiple points in time, a point in time (111), corresponding to a determined minimum noise value (206) or a determined maximum signal to noise ratio value (213), for detecting the sampled signal (110) to produce the detected signal (112).

20 Claims, 4 Drawing Sheets

APPARATUS AND METHOD FOR DETERMINING A POINT IN TIME FOR DETECTING A SAMPLED SIGNAL IN A RECEIVER

FIELD OF THE INVENTION

The present invention relates generally to communications and more particularly to an apparatus and method for determining a point in time for detecting a sampled signal in a receiver.

BACKGROUND OF THE INVENTION

The basic operation and structure of communication systems such as cellular radio telephone communication systems and land mobile communication systems are well known in the art. Communication systems typically comprise a plurality of communication units, a predetermined number of base stations (or repeaters) located throughout a geographic region and a controller. The communication units may be vehicle mounted or portable units. The communication units and the base stations each comprise either a transmitter or a receiver or both to form transceiver. The communication units are coupled to the base stations by a communication channel over which modulated signals, such as radio frequency (RF) signals, are transmitted and/or received. The controller comprises a centralized call processing unit or a network of distributed controllers working together to establish communication paths for the communication units in the communication system.

More particularly, a receiver of the communication unit receives a modulated signal subsequent to transmission thereof by a transmitter of the base station on the communication channel. The receiver includes a down converter, a sampler and a detector. The down converter translates the received modulated signal to baseband frequency to produce a down converted signal. The sampler samples the down converted signal at multiple points in time to produce a sampled signal. The detector detects the sampled signal at one of the multiple points in time to produce a detected signal. The detector is typically a coherent detector or a maximum likelihood sequence estimator (MLSE) detector. The MLSE detector is also sometimes referred to as an MLSE equalizer.

Transmission impairments resulting in inaccurate detection of the modulated signal transmitted on the communication channel are primarily caused by spurious and thermal noise, adjacent and co-channel interference, intersymbol interference and flat fading due to multipath interference. These transmission impairments sometimes cause the receiver to determine the wrong point in time at which to detect the sampled signal.

Peak correlation is a well known technique that attempts to overcome the transmission impairments for determining the point in time at which to detect the sampled signal. Correlation is a well known technique for estimating an impulse response of the communication channel by correlating, or matching, the modulated signal with a predetermined signal stored in the receiver. The point in time selected to detect the sampled signal corresponds to a peak of the estimated channel impulse response.

Peak correlation performs well under flat fading channel conditions because it selects the point in time corresponding to the strongest signal component. However, under intersymbol interference channel conditions, the peak correlation technique sometimes selects a suboptimal point in time because the peak correlation technique ignores the level of the intersymbol interference and the effect that the intersymbol interference will have on the detector.

Therefore, there is a need for an improved apparatus and method for determining a point in time for detecting a sampled signal in a receiver for intersymbol interference conditions.

BRIEF DESCRIPTION OF THE DRAWINGS

A detailed description of the preferred embodiments of the present invention will be better understood when read with reference to the accompanying drawings in which.

DETAILED DESCRIPTION OF THE PREFERRED EMBODIMENTS

Figure 1:
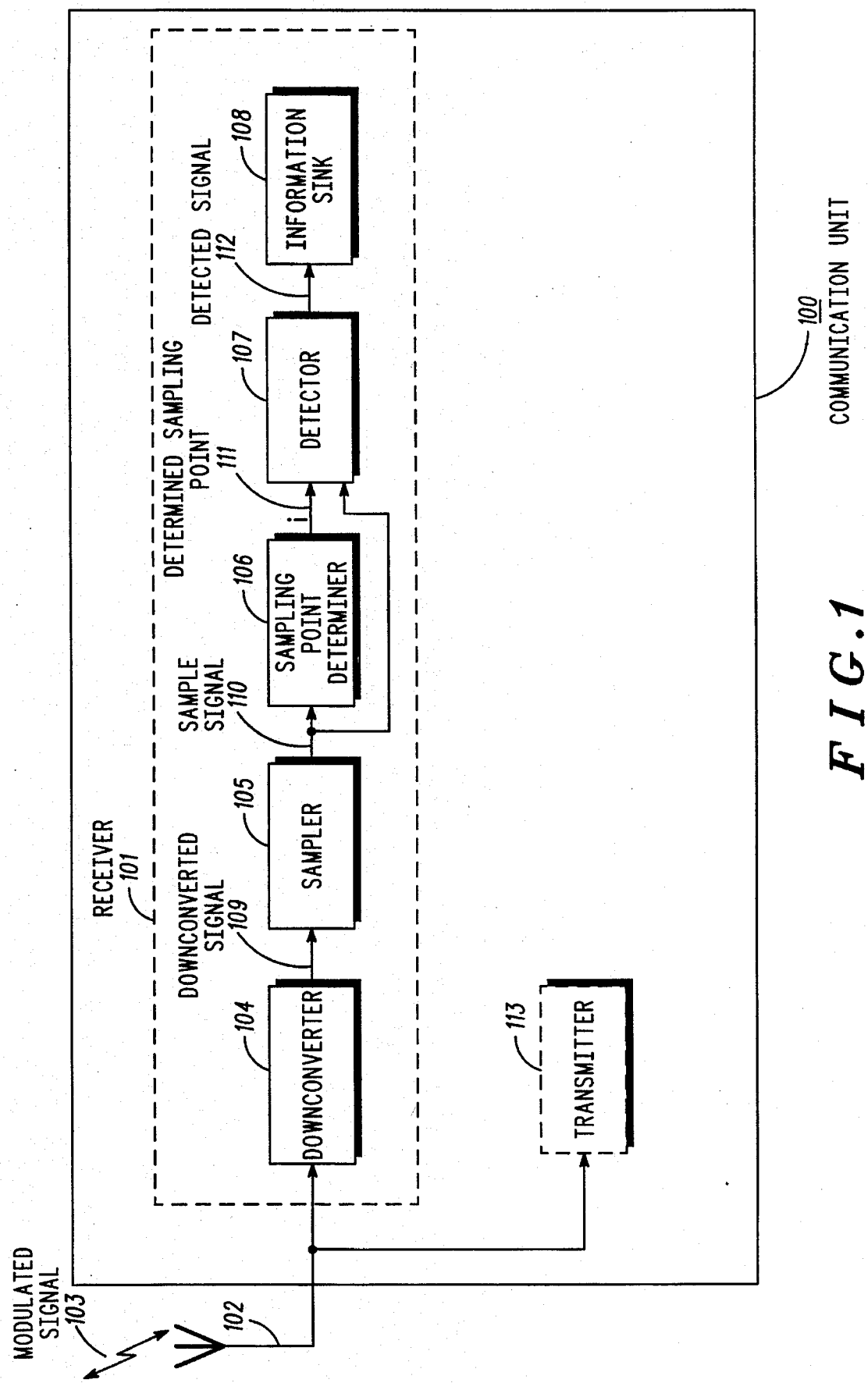
FIG. 1 illustrates a block diagram of a communication unit, including a sampling point determiner, in accordance with the present invention.

Generally, the present invention is used in a receiver that receives a modulated signal subsequent to transmission thereof by a transmitter on a communication channel. The receiver includes a down converter coupled to receive the modulated signal and operative to translate the received modulated signal to baseband frequency to produce a down converted signal, and a sampler coupled to receive the down converted signal and operative to sample the down converted signal at multiple points in time to produce a sampled signal.

Conceptually, the present invention provides an apparatus and method for selecting a point in time for detecting the sampled signal to produce a detected signal. A channel model generator receives the signal and models, at the multiple points in time, the communication channel responsive to the sampled signal to produce a noise channel model. A noise value generator generates, at the multiple points in time, a noise value indicative of the quantity of noise in the noise channel model. A signal level determiner determines from the generated noise values a minimum noise value. A sampling point selector selects, from among the multiple points in time, the point in time corresponding to the determined minimum noise value for detecting the sampled signal to produce the detected signal.

In further detail, the channel model generator includes a channel impulse response estimator and a channel impulse response allocator. The channel impulse response estimator receives the sampled signal and estimates, at the multiple points in time, a channel impulse response for the communication channel responsive to the sampled signal to produce an estimated channel impulse response. The channel impulse response allocator receives the estimated channel impulse response and allocates, at the multiple points in time, a portion of the estimated channel impulse response as the noise channel model.

Alternatively, the channel model receives the sampled signal and models, at the multiple points in time, the communication channel responsive to the sampled signal to produce a signal channel model. A signal value generator receives the signal channel model and generates, at the multiple points in time, a signal value indicative of the quantity of signal in the signal channel model. A ratio determiner receives the generated signal value and the generated noise value and determines, at the multiple points in time, a ratio of the generated signal value to the generated noise value. The signal level determiner receives the determined ratios at multiple points in time and determines, from the ratios determined at the multiple points in time, a maximum ratio. The sampling point selector selects, from among the multiple points in time, a point in time corresponding to the determined maximum ratio for detecting the sampled signal to produce the detected signal.

The detailed description of the preferred embodiments of the present invention can be better understood when read with reference to the accompanying drawings illustrated in FIGS. 1–5.

FIG. 1 illustrates a block diagram of a communication unit, including a sampling point determiner, in accordance with the present invention. The communication unit 100 generally includes an antenna 102 and a receiver 101. The receiver 101 generally includes a down converter 104, a sampler 105, a novel sampling point determiner 106, a detector 107, and an information sink 108. Individually, elements 102, 104, 105, 107, and 108 are well known in the art and no further discussion will be presented except to facilitate the understanding of the present invention.

A receiver 101 receives the modulated signal 103 subsequent to transmission thereof by a transmitter on a communication channel. A down converter 104 is coupled to receive the modulated signal 103 and is operative to down convert the modulated signal to produce a down converted signal 109. A sampler 105 is coupled to receive the down converted signal 109 and is operative to sample the down converted signal at multiple points in time to produce a sampled signal 110. A sampling point determiner 106 is coupled to receive the sampled signal 110 and is operative to determine a point in time at which to detect the sampled signal, as indicated by determined sampling point output 111. A detector 107 is coupled to receive the sampled signal 110 and is operative to detect the sampled signal at the determined point in time 111 to produce the detected signal 112.

In the preferred embodiment, the modulated signal 103 is a π/4 QPSK (quadrature phase shift keying) having sequential symbols as is well known in the art. In the preferred embodiment, down converter 104 is operative to translate the received modulated signal to baseband frequency. The down conversion typically involves one or more stages of conventional mixing and filtering elements, and can be performed with either analog or digital circuitry. In the preferred embodiment, the sampler 105 is an analog to digital converter, such as model DSP56ADC16, manufactured by Motorola, Inc. A typical transmission rate for the modulated signal is 24.3 thousand symbols per second, and a typical sampling rate is eight times the transmission rate.

In the preferred embodiment, detector 107 is a maximum likelihood sequence estimator (MLSE). The MLSE enables the receiver to operate in channels with intersymbol interference. The operation of the MLSE is well known in the art as described in a paper by Gottfried Ungerboeck entitled "Adaptive Maximum-Likelihood Receiver for Carrier-Modulated Data-Transmission Systems," which is published in IEEE Transactions on Communications, Vol. Com-22, No. 5, May 1974. Sampling point determiner 106 and detector 107 can be implemented in a digital signal processor, such as model DSP56001, manufactured by Motorola, Inc.

Communication unit 100 may optionally include a transmitter 113. Transmitter 113 is coupled with antenna 102 to transmit information to another remotely located communication unit. When transmitter 113 is included in communication unit 100, the communication unit is commonly referred to as a transceiver.

The present invention may be advantageously utilized in a digital radio receiver adapted for use in a digital radio communication system.

Figure 2:
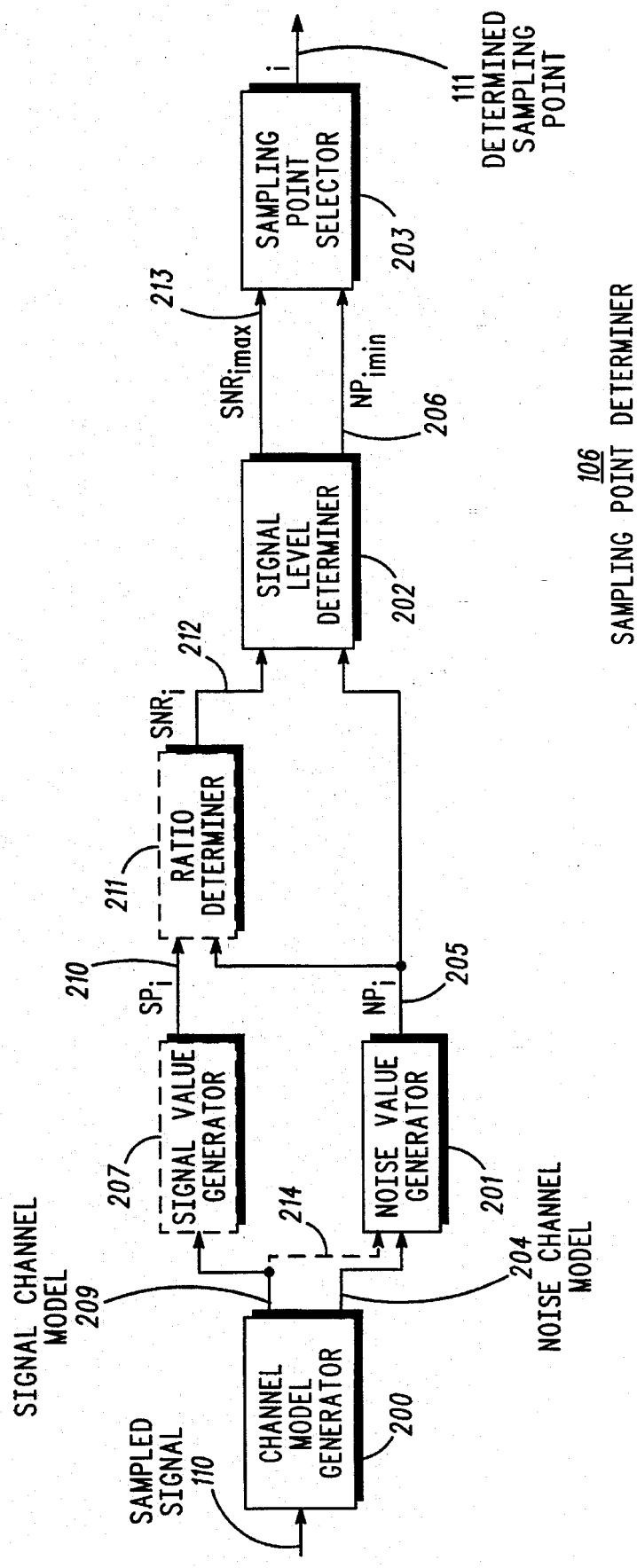
FIG. 2 illustrates a block diagram of the sampling point determiner, including a channel model generator and a noise value generator, as shown in the communication unit of FIG. 1 in accordance with the present invention.

FIG. 2 illustrates a block diagram of the sampling point determiner 106, including a channel model generator 200 and a noise value generator 201, as shown in the communication unit 100 of FIG. 1 in accordance with the present invention. The sampling point determiner 106 generally includes a channel model generator 200, a noise value generator 201, a signal level determiner 202, and a sampling point selector 203. Individually, elements 201, 202, and 203 are well known in the art and no further discussion will be presented except to facilitate the understanding of the present invention. An example of the operation of the noise value generator 201 will be described in detail in conjunction with the example illustrated in FIG. 4.

Generally, the sampling point determiner 106 determines one of the multiple points in time for detecting the sampled signal 110 to produce a detected signal. A channel model generator 200 is coupled to receive the sampled signal 110 and is operative to model, at the multiple points in time, the communication channel responsive to the sampled signal 110 to produce at least a noise channel model 204. A noise value generator 201 is coupled to receive the noise channel model 204 and is operative to generate, at the multiple points in time, a noise value 205 indicative of the quantity of noise in the noise channel model. A signal level determiner 202 is coupled to receive the noise values 205 generated at the multiple points in time and is operative to determine from the generated noise values a minimum noise value 206. A sampling point selector 203 is coupled to receive the determined minimum noise value 206 and is operative to select, from among the multiple points in time, a first point in time 111 corresponding to the determined minimum noise value 206 for detecting the sampled signal 110 with detector 107 of FIG. 1 to produce the detected signal 112 of FIG. 1.

In the preferred embodiment, detector 107 is an MLSE detector. It is well known in the art that the complexity of the MLSE grows exponentially as the memory range of the MLSE is increased. The memory range of the MLSE is the number of intersymbol interference components that can be treated as desired signal components. The intersymbol interference components that are outside the memory range of the MLSE detector are considered to be noise and are output from channel model generator 200 as the noise channel model 204. Because of practical limits on the computational power of digital signal processors, the memory range of an MLSE implemented in a digital signal processor may have to be made smaller than the actual number of intersymbol interference components. An advantage of the present invention is that the sampling point determiner 106 determines the sampling point for detecting the signal that minimizes the level of intersymbol interference components that are outside the memory range of the MLSE detector. This allows an MLSE detector with a smaller memory range to advantageously use the present invention to perform nearly as well as an MLSE detector with a larger memory range using the prior art peak correlation technique for determining the sampling point. After the sampling point has been determined by the sampling point determiner 106, subsequently received modulated symbols can be detected at times which are an integer multiple of the symbol duration away from the determined sampling point.

FIG. 2 also illustrates an alternate embodiment of the present invention. In the alternate embodiment, the sampling point determiner 106 generally includes a channel model generator 200, a signal value generator 207, a noise value generator 201, a ratio determiner 211, a signal level determiner 202, and a sampling point selector 203. Individually, elements 201–203, 207, 211 are well known in the art and no further discussion will be presented except to facilitate the understanding of the present invention. An example of the operation of the signal value generator 207 will be described in detail in conjunction with the example illustrated in FIG. 4.

The channel model generator 200 is coupled to receive the sampled signal 110 and is operative to model, at the multiple points in time, the communication channel responsive to the sampled signal 110 to produce at least a signal channel model 209. A signal value generator 207 is coupled to receive the signal channel model 209 and is operative to generate, at the multiple points in time, a signal value 210 indicative of the quantity of signal in the signal channel model 209. A ratio determiner 211 is coupled to receive the generated signal value 210 and the generated noise value 205 and is operative to determine, at the multiple points in time, a ratio of the generated signal value 210 to the generated noise value 205. The signal level determiner 202 is coupled to receive the determined ratios 212 at the multiple points in time and is operative to determine, from the ratios determined at the multiple points in time, a maximum ratio 213. The sampling point selector 203 selects, from among the multiple points in time, a second point in time 111 corresponding to the determined maximum ratio 213 for detecting the sampled signal 110.

The advantage of the second preferred embodiment of the sampling point determiner 106 is that it determines the sampling point which corresponds to the maximum signal to noise ratio for the MLSE detector. In this case, the main signal component and the intersymbol interference components within the memory range of the MLSE detector are considered to be signal and are output from channel model generator 200 as the signal channel model 209. The intersymbol interference components that are outside the memory range of the MLSE detector are considered to be noise and are output from channel model generator 200 as the noise channel model 204. To obtain the best performance from the MLSE detector, the signal value 210 must be made as large as possible while the noise value 205 is simultaneously made as small as possible. This operation is performed by the ratio determiner 211.

Figure 3:
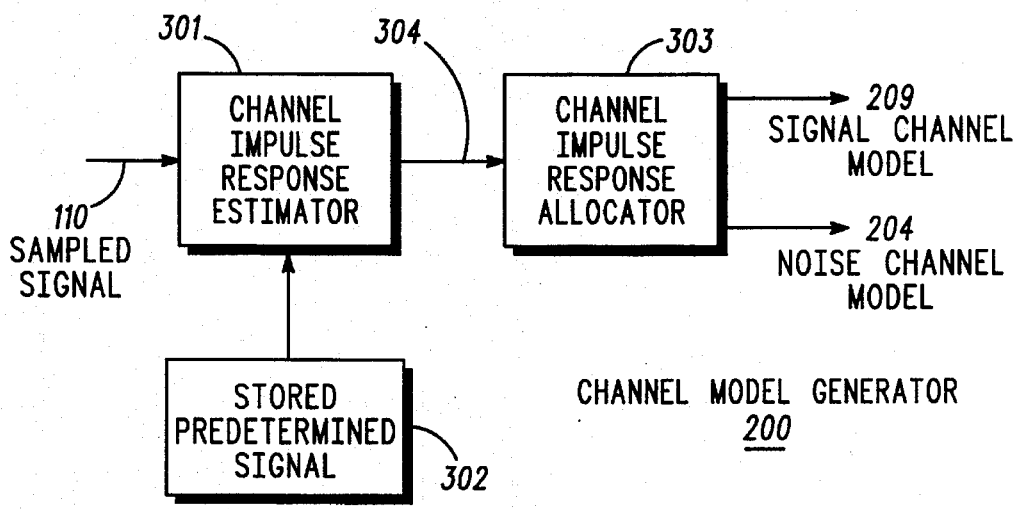
FIG. 3 illustrates a block diagram of the channel model generator, including a channel impulse response estimator and a channel impulse response allocator, as shown in the sampling point determiner of FIG. 2 in accordance with the present invention.
Figure 4:
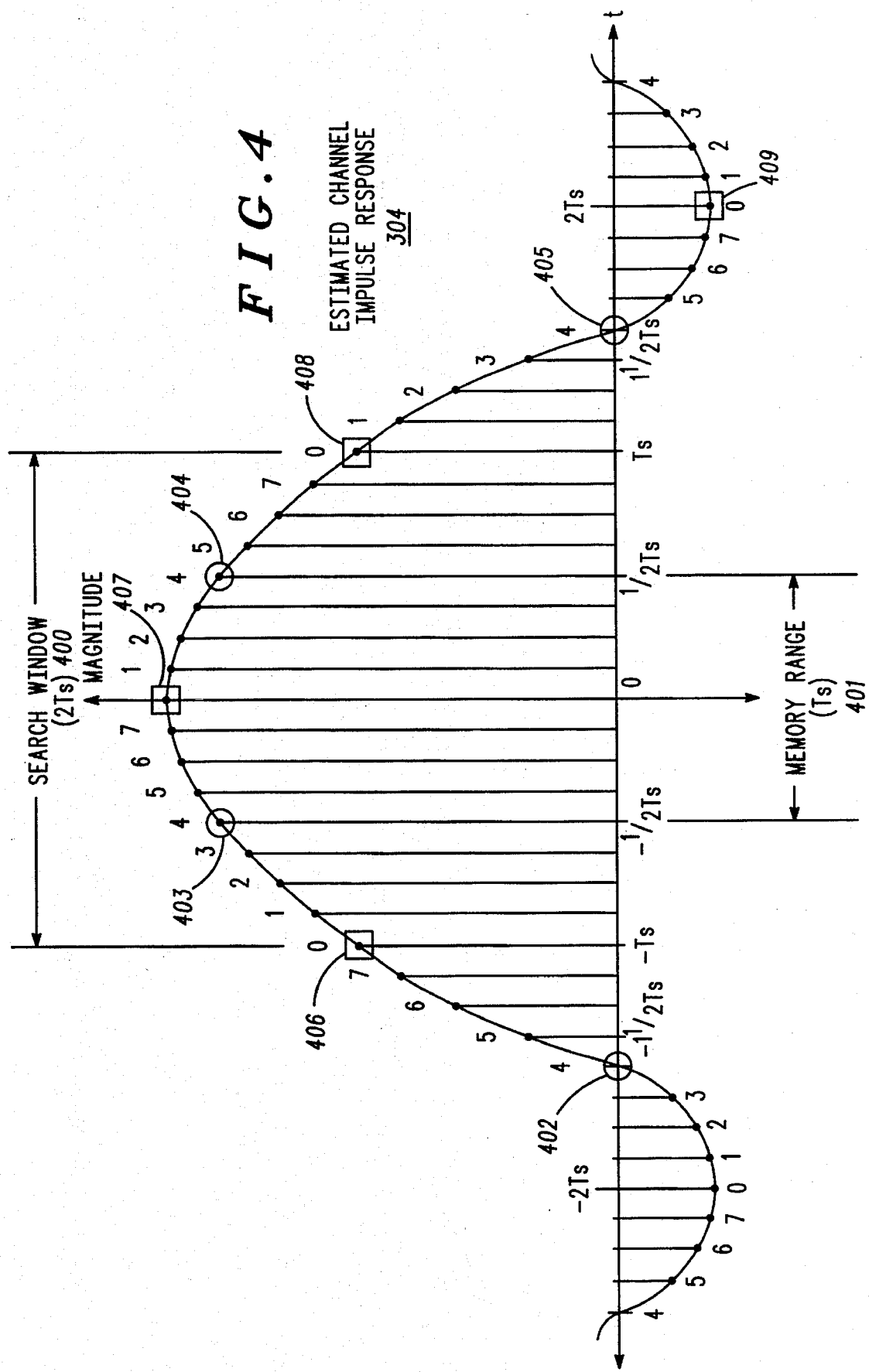
FIG. 4 illustrates a portion of an estimated channel impulse response generated by the channel impulse response estimator and modeled as a signal channel model and a noise channel model by the channel impulse response allocator as shown in FIG. 3 in accordance with the present invention.

FIGS. 3 and 4 are described together. FIG. 3 illustrates a block diagram of the channel model generator 200, including a channel impulse response estimator 301 and a channel impulse response allocator 303, as shown in the sampling point determiner 106 of FIG. 2 in accordance with the present invention. FIG. 4 illustrates a portion of an estimated channel impulse response generated by the channel impulse response estimator 301 and modeled as a signal channel model 209 and a noise channel model 204 by the channel impulse response allocator 303 as shown in FIG. 3 in accordance with the present invention.

Channel model generator 200 of FIG. 3 generally includes a channel impulse response generator 301, a stored predetermined signal 302, and a channel impulse response allocator 303. Individually, elements 301 and 302 are well known in the art and no further discussion will be presented except to facilitate the understanding of the present invention.

Channel impulse response estimator 301 is coupled to receive the sampled signal 110 and is operative to estimate, at the multiple points in time, a channel impulse response for the communication channel responsive to the sampled signal 110 to produce an estimated channel impulse response 304. A channel impulse response allocator is coupled to receive the estimated channel impulse response 304 and is operative to allocate, at the multiple points in time, at least a portion of the estimated channel impulse response as the noise channel model 204.

In the preferred embodiment, the channel impulse response estimator 301 estimates a channel impulse response for several possible sampling points in the sampled signal 110 with a conventional block least squares method which uses the stored predetermined signal 302 and the sampled signal 110. The operation of a channel impulse response estimator using a block least squares method for generating the channel impulse response is described in an article entitled "Adaptive Equalization and Diversity Combining for a Mobile Radio Channel", by Norm W. K. Lo, David D. Falconer, and Asrar U. H. Sheikh, which is published in the IEEE Globecom '90 proceedings. The estimated channel impulse represents the estimate of the main signal component and the intersymbol interference components associated with a particular sampling point. The stored predetermined signal 302 is a replica of a synchronization symbol sequence that is periodically present in the modulated signal 103. Other conventional methods of estimating the channel impulse response include correlation between the sampled signal 110 and the stored predetermined signal 302, and blind estimation methods which do not require the use of a stored predetermined signal.

FIG. 4 will be used to illustrate the operation of the channel impulse response estimator 301 and the channel impulse response allocator 303. In the example of FIG. 4, the sampler 105 of FIG. 1 samples at a rate which is eight times the symbol transmission rate, where $f_s$ is the symbol transmission rate, and $T_s = 1/f_s$ is the symbol spacing. In the example of FIG. 4, the channel impulse response estimator is capable of estimating four components of the channel for a particular sampling point. These channel components are commonly referred to as channel taps, and they are spaced $T_s$ apart since the intersymbol interference components are $T_s$ apart. The four channel taps are estimated for each sampling point over a predetermined search window 400 having a width of $2T_s$. The size of the search window 400 is generally determined by the uncertainty of the arrival time of the synchronization symbol sequence portion of the modulated signal and the amount of variation that is expected to occur in the channel impulse response 304 between the arrival of subsequent synchronization symbol sequences. The center of the search window represents the sampling point corresponding to the time that the synchronization symbol sequence portion of the modulated signal 103 is expected to arrive. This sampling point is assigned an index of zero. The four channel taps associated with a sampling point index of zero are indicated by boxes 406, 407, 408, and 409, and are referred to as $h_1^0$, $h_2^0$, $h_3^0$, and $h_4^0$, respectively. The superscript of zero indicates that the channel taps are associated with a sampling point index of zero. The subscript denotes which of the four taps is being specified. The four channel taps associated with a sampling point of $-(½)T_s$, which is assigned an index of $-4$ since it is four samples earlier than the sampling point of zero, are indicated by the circles 402, 403, 404, and 405. These channel taps are referred to as $h_1^{-4}$, $h_2^{-4}$, $h_3^{-4}$, and $h_4^{-4}$, respectively.

Now the operation of the channel impulse response allocater 303 will be described in more detail. In the preferred embodiment, the MLSE detector has a memory range of 1 intersymbol interference component. Therefore the MLSE detector can utilize a main signal component and 1 intersymbol interference component as signal, and the remaining intersymbol interference components are considered to be noise. In the preferred embodiment the main signal component and the intersymbol interference component utilized by the MLSE detector are $h_2^i$ and $h_3^i$, where i is the index of the sampling point. The channel impulse response allocator 303 allocates $h_1^i$ and $h_4^i$ to be the noise channel model 204, and optionally allocates $h_2^i$ and $h_3^i$ to be the signal channel model 209. $h_1^i$ and $h_4^i$ are allocated to be the noise channel model because they are intersymbol interference components which are outside the memory range of the MLSE detector.

Now referring back to FIG. 2, an example of a method that can be used by the noise value generator 201 to calculate the noise value 205 is illustrated by the following equation.

$$NP_i = |h_1^i|^2 + |h_4^i|^2$$

An example of a method that can be used by the optional signal value generator 207 to calculate the signal value 210 is illustrated by the following equation.

$$SP_i = |h_2^i|^2 + |h_3^i|^2$$

Now an example illustrating the benefit of the present invention over the prior art peak correlation method will be described. Referring to FIG. 4, the peak correlation method would select a sampling point index of zero because the peak of the impulse response occurs at an index of zero. The MLSE detector would then have at least two intersymbol interference components, as indicated by boxes 406 and 409, which are outside the memory range of the MLSE detector. This will cause the performance of the MLSE detector to degrade. In this case, the memory range of the MLSE detector would have to be increased to obtain good performance with the peak correlation sampling method. The present invention, however, would select a sampling point index of $-4$ because the intersymbol interference components outside the memory range of the MLSE detector, as indicated by circles 402 and 405, have a value of zero. This example illustrates how the use of the present invention enables an MLSE detector with a smaller memory range to perform as well as an MLSE detector with a larger memory range used with the peak correlation method.

Figure 5:
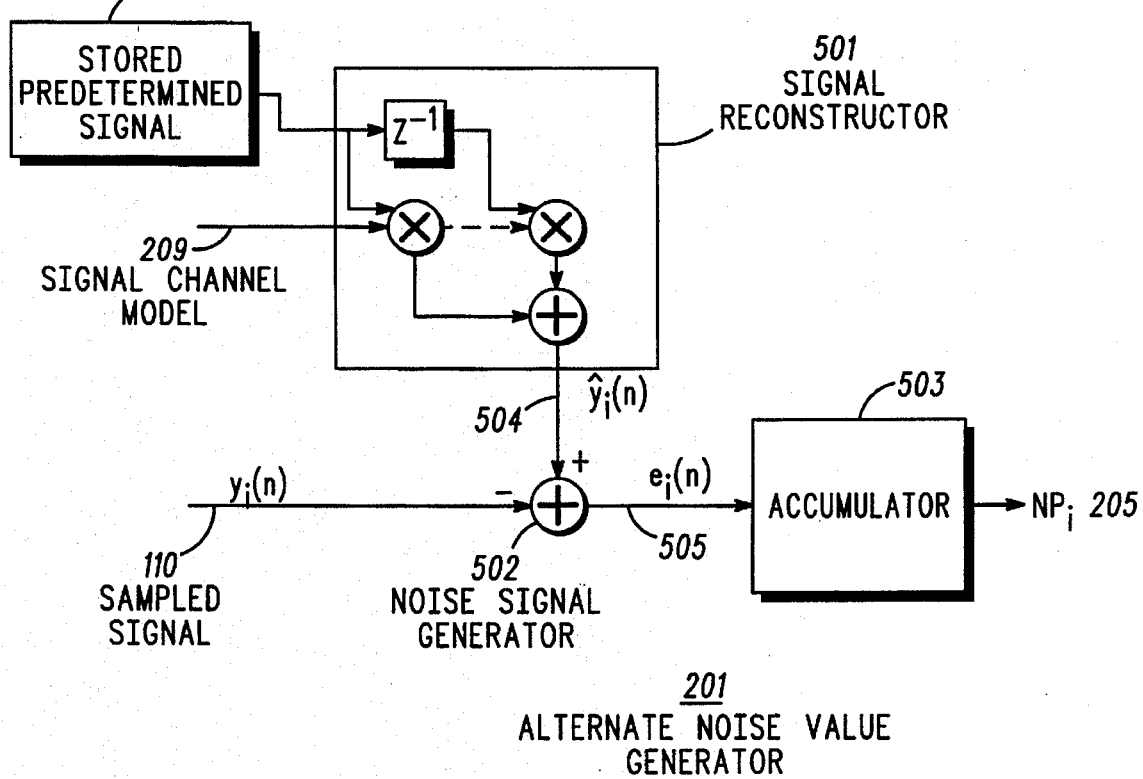
FIG. 5 illustrates a block diagram of an alternate noise value generator as shown in the sampling point determiner of FIG. 2 in accordance with the present invention.

FIG. 5 illustrates a block diagram of an alternate noise value generator 201 as shown in the sampling point determiner of FIG. 2 in accordance with the present invention. The alternate noise value generator 201 generally includes a stored predetermined signal 500, a signal reconstructor 501, a noise signal generator 502, and an accumulator 503. Individually, elements 500–503 are well known in the art and no further discussion will be presented except to facilitate the understanding of the present invention.

A signal reconstructor 501 is coupled to receive the signal channel model 209 on an alternate line 214 rather than the noise channel model 204 and is operative to reconstruct, at the multiple points in time, a signal responsive to the signal channel model to produce a reconstructed signal 504. A noise signal generator 502 is coupled to receive the reconstructed signal 504 and the sampled signal 110 and is operative to generate, at the multiple points in time, a noise signal 505 responsive to the difference between the reconstructed signal 504 and the sampled signal 110. An accumulator 503 is coupled to receive the generated noise signal 505 and is operative to accumulate the generated noise signal 505, at the multiple points in time, to produce the noise value 205 indicative of the quantity of noise in the noise channel model 204 of FIG. 2.

An example of the operation of the alternate noise value generator 201, in accordance with the alternate embodiment of the present invention, will now be given. The reconstructed signal 504 is generated by convolving the stored predetermined signal 500 with the signal channel model 209 using the signal reconstructor 501. The reconstructed signal 504 produced by the signal reconstructor 501 is illustrated by the following equation.

$$\hat{y}_i(n) = \sum_{k=2}^{3} a(n-k+2)h_k^i$$

where a(m) denotes the $m^{th}$ element of the stored predetermined signal, and i is the sampling point index. The accumulator 503 generates the noise value 205 by adding the magnitude squared of the noise values 505 as illustrated by the following equation, $$NP_i = \Sigma |\hat{y}_i(n) - y_i(n)|^2$$

where $y_i(n)$ is the sampled signal 110 at the $i^{th}$ sampling point index.

An advantage of the alternate noise value generator 201 is that the noise value will reflect all of the intersymbol interference components that are outside the memory range of the MLSE detector. The number of intersymbol interference components that will be reflected in the preferred embodiment of the noise value generator is limited by the number of noise channel model taps that can be generated by the channel model generator 200 of FIG. 2. In the example of FIG. 4, two intersymbol interference components will be reflected in the noise value. When more than 2 intersymbol interference components are outside the memory range of the MLSE detector, the alternate noise value generator will generate a more accurate noise value.

The present invention provides an apparatus and method for selecting a point in time for detecting the sampled signal to produce a detected signal thus overcoming the problems of the prior art. Because of practical limits on the computational power of digital signal processors, the memory range of an MLSE implemented in a digital signal processor may have to be made smaller than the actual number of intersymbol interference components. The present invention determines the sampling point for detecting the signal that minimizes the level of intersymbol interference components that are outside the memory range of the MLSE detector. This allows an MLSE detector with a smaller memory range using the present invention to perform nearly as well as an MLSE detector with a larger memory range using the prior art peak correlation technique for determining the sampling point.

What is claimed is:

1. In a receiver that receives a modulated signal subsequent to transmission thereof by a transmitter on a communication channel, wherein the receiver down converts the modulated signal to produce a down converted signal and samples the down converted signal at multiple points in time to produce a sampled signal, a method for determining one of the multiple points in time for detecting the sampled signal to produce a detected signal, comprising the steps of:

modeling, at the multiple points in time, the communication channel responsive to the sampled signal to produce at least a noise channel model;

generating, at the multiple points in time, a noise value indicative of a quantity of noise in the noise channel model;

determining, from the noise value generated at the multiple points in time, a minimum noise value; and selecting, from among the multiple points in time, a first point in time corresponding to the minimum noise value for detecting the sampled signal to produce the detected signal.

2. A method in accordance with claim 1 wherein the step of modeling the communication channel further comprises the steps of:

estimating, at the multiple points in time, a channel impulse response for the communication channel responsive to the sampled signal to produce an estimated channel impulse response; and allocating, at the multiple points in time, at least a portion of the estimated channel impulse response as the noise channel model.

3. A method in accordance with claim 1 further comprising the step of detecting, with a maximum likelihood sequence estimator (MLSE) detector, the sampled signal to produce the detected signal.

4. A method in accordance with claim 1 wherein the step of generating the noise value further comprises the steps of:

reconstructing, at the multiple points in time, the sampled signal responsive to a signal channel model, produced by the step of modeling, to produce a reconstructed signal;

generating, at the multiple points in time, a noise signal responsive to the difference between the reconstructed signal and the sampled signal; and accumulating, at the multiple points in time, the noise signal to produce the noise value indicative of the quantity of noise in the noise channel model.

5. A method in accordance with claim 1 further comprising the steps of:

modeling, at the multiple points in time, the communication channel responsive to the sampled signal to produce at least a signal channel model;

generating, at the multiple points in time, a signal value indicative of a quantity of signal in the signal channel model;

determining, at the multiple points in time, a ratio of the signal value to the noise value;

determining, from the ratio determined at the multiple points in time, a maximum ratio; and wherein the step of selecting selects, from among the multiple points in time, a second point in time corresponding to the maximum ratio for detecting the sampled signal to produce the detected signal.

6. A method in accordance with claim 5 wherein the step of modeling the communication channel to produce the at least the signal channel model further comprises the steps of:

estimating, at the multiple points in time, a channel impulse response for the communication channel responsive to the sampled signal to produce an estimated channel impulse response; and allocating, at the multiple points in time, at least a portion of the estimated channel impulse response as the signal channel model.

7. A method in accordance with claim 6 further comprising the step of detecting, with a maximum likelihood sequence estimator (MLSE) detector, the sampled signal to produce the detected signal.

8. A method for using a communication unit including a receiver that receives a modulated signal subsequent to transmission thereof by a transmitter on a communication channel, the method comprising the steps of:

down converting the modulated signal to produce a down converted signal;

sampling, at the multiple points in time, the down converted signal to produce a sampled signal;

modeling, at the multiple points in time, the communication channel responsive to the sampled signal to produce at least a noise channel model;

generating, at the multiple points in time, a noise value indicative of a quantity of noise in the noise channel model;

determining, from the noise value generated at the multiple points in time, a minimum noise value;

selecting, from among the multiple points in time, a first point in time corresponding to the minimum noise value; and detecting the sampled signal at the first point in time to produce a detected signal.

9. A method in accordance with claim 8 wherein the step of modeling the communication channel further comprises the steps of:

estimating, at the multiple points in time, a channel impulse response for the communication channel responsive to the sampled signal to produce an estimated channel impulse response; and allocating, at the multiple points in time, at least a portion of the estimated channel impulse response as the noise channel model.

10. A method in accordance with claim 8 further comprising the steps of:

modeling, at the multiple points in time, the communication channel responsive to the sampled signal to produce at least a signal channel model;

generating, at the multiple points in time, a signal value indicative of a quantity of signal in the signal channel model;

determining, at the multiple points in time, a ratio of the signal value to the noise value;

determining, from the ratio determined at the multiple points in time, a maximum ratio;

wherein the step of selecting selects, from among the multiple points in time, a second point in time corresponding to the maximum ratio; and wherein the step of detecting detects the sampled signal at the second point in time to produce the detected signal.

11. A method in accordance with claim 10 wherein the step of modeling the communication channel to produce the at least the signal channel model further comprises the steps of:

estimating, at the multiple points in time, a channel impulse response for the communication channel responsive to the sampled signal to produce an estimated channel impulse response; and allocating, at the multiple points in time, at least a portion of the estimated channel impulse response as the signal channel model.

12. In a receiver that receives a modulated signal subsequent to transmission thereof by a transmitter on a communication channel, wherein the receiver includes a down converter coupled to receive the modulated signal and operative to demodulate the modulated signal to produce a down converted signal and a sampler coupled to receive the down converted signal and operative to sample the down converted signal at multiple points in time to produce a sampled signal, an apparatus for determining one of the multiple points in time for detecting the sampled signal to produce a detected signal, comprising:

a channel model generator coupled to receive the sampled signal and operative to model, at the multiple points in time, the communication channel responsive to the sampled signal to produce at least a noise channel model;

a noise value generator coupled to receive the noise channel model and operative to generate, at the multiple points in time, a noise value indicative of a quantity of noise in the noise channel model;

a signal level determiner coupled to receive the noise value generated at the multiple points in time and operative to determine from the noise values a minimum noise value; and a sampling point selector coupled to receive the minimum noise value and operative to select, from among the multiple points in time, a first point in time corresponding to the minimum noise value for detecting the sampled signal to produce the detected signal.

13. An apparatus in accordance with claim 12 wherein the channel model generator further comprises:

a channel impulse response estimator coupled to receive the sampled signal and operative to estimate, at the multiple points in time, a channel impulse response for the communication channel responsive to the sampled signal to produce an estimated channel impulse response; and a channel impulse response allocator coupled to receive the estimated channel impulse response and operative to allocate, at the multiple points in time, at least a portion of the estimated channel impulse response as the noise channel model.

14. An apparatus in accordance with claim 12 wherein the noise value generator further comprises:

a signal reconstructor coupled to receive a signal channel model and operative to reconstruct, at the multiple points in time, the sampled signal responsive to the signal channel model, produced by the channel model generator, to produce a reconstructed signal;

a noise signal generator coupled to receive the reconstructed signal and the sampled signal and operative to generate, at the multiple points in time, a noise signal responsive to the difference between the reconstructed signal and the sampled signal; and an accumulator coupled to receive the noise signal and operative to accumulate the noise signal, at the multiple points in time, to produce the noise value indicative of the quantity of noise in the noise channel model.

15. An apparatus in accordance with claim 12 further comprising:

the channel model generator coupled to receive the sampled signal and operative to model, at the multiple points in time, the communication channel responsive to the sampled signal to produce at least a signal channel model;

a signal value generator coupled to receive the signal channel model and operative to generate, at the multiple points in time, a signal value indicative of a quantity of signal in the signal channel model;

a ratio determiner coupled to receive the signal value and the noise value and operative to determine, at the multiple points in time, a ratio of the signal value to the noise value;

the signal level determiner coupled to receive the ratio at multiple points in time and operative to determine, from the ratio determined at the multiple points in time, a maximum ratio; and wherein sampling point selector selects, from among the multiple points in time, a second point in time corresponding to the maximum ratio for detecting the sampled signal to produce the detected signal.

16. An apparatus in accordance with claim 15 wherein the channel model generator further comprises:

a channel impulse response estimator coupled to receive the sampled signal and operative to estimate, at the multiple points in time, a channel impulse response for the communication channel responsive to the sampled signal to produce an estimated channel impulse response; and a channel impulse response allocator coupled to receive the estimated channel impulse response and operative to allocate, at the multiple points in time, at least a portion of the estimated channel impulse response as the signal channel model.

17. A communication unit including a receiver that receives a modulated signal subsequent to transmission thereof by a transmitter on a communication channel, the communication unit comprising:

a down converter coupled to receive the modulated signal and operative to down convert the modulated signal to produce a down converted signal;

a sampler coupled to receive the down converted signal and operative to sample the down converted signal at multiple points in time to produce a sampled signal;

a channel model generator coupled to receive the sampled signal and operative to model, at the multiple points in time, the communication channel responsive to the sampled signal to produce at least a noise channel model;

a noise value generator coupled to receive the noise channel model and operative to generate, at the multiple points in time, a noise value indicative of a quantity of noise in the noise channel model;

a signal level determiner coupled to receive the noise value generated at the multiple points in time and operative to determine from the noise value generated at the multiple points in time a minimum noise value;

a sampling point selector coupled to receive the minimum noise value and operative to select, from among the multiple points in time, a first point in time corresponding to the minimum noise value; and a detector coupled to receive the sampled signal and operative to detect the sampled signal at the first point in time to produce a detected signal.

18. An apparatus in accordance with claim 17 wherein the channel model generator further comprises:

a channel impulse response estimator coupled to receive the sampled signal and operative to estimate, at the multiple points in time, a channel impulse response for the communication channel responsive to the sampled signal to produce an estimated channel impulse response; and a channel impulse response allocator coupled to receive the estimated channel impulse response and operative to allocate, at the multiple points in time, at least a portion of the estimated channel impulse response as the noise channel model.

19. An apparatus in accordance with claim 17 further comprising:

the channel model generator coupled to receive the sampled signal and operative to model, at the multiple points in time, the communication channel responsive to the sampled signal to produce at least a signal channel model;

a signal value generator coupled to receive the signal channel model and operative to generate, at the multiple points in time, a signal value indicative of a quantity of signal in the signal channel model;

a ratio determiner coupled to receive the signal value and the noise value and operative to determine, at the multiple points in time, a ratio of the signal value to the noise value;

the signal level determiner coupled to receive the ratio at multiple points in time and operative to determine, from the ratio determined at the multiple points in time, a maximum ratio;

wherein sampling point selector selects, from among the multiple points in time, a second point in time corresponding to the maximum ratio for detecting the sampled signal to produce the detected signal; and wherein the detector detecting detects the sampled signal at the second point in time to produce the detected signal.

20. An apparatus in accordance with claim 19 wherein the channel model generator further comprises:

a channel impulse response estimator coupled to receive the sampled signal and operative to estimate, at the multiple points in time, a channel impulse response for the communication channel responsive to the sampled signal to produce an estimated channel impulse response; and a channel impulse response allocator coupled to receive the estimated channel impulse response and operative to allocate, at the multiple points in time, at least a portion of the estimated channel impulse response as the signal channel model.

* * * * *